US008931598B2

(12) United States Patent
Aguado et al.

(10) Patent No.: US 8,931,598 B2
(45) Date of Patent: Jan. 13, 2015

(54) GOVERNOR SHEAVE WITH AN OVERLAPPING FLYWEIGHT SYSTEM

(75) Inventors: Jose Miguel Aguado, Madrid (ES); Luis Marti, Madrid (ES); Jose Luis Vergara, Madrid (ES)

(73) Assignee: Otis Elevator Company, Farmington, CT (US)

( * ) Notice: Subject to any disclaimer, the term of this patent is extended or adjusted under 35 U.S.C. 154(b) by 1070 days.

(21) Appl. No.: 12/530,361

(22) PCT Filed: Apr. 13, 2007

(86) PCT No.: PCT/EP2007/003299
§ 371 (c)(1),
(2), (4) Date: Sep. 8, 2009

(87) PCT Pub. No.: WO2008/125133
PCT Pub. Date: Oct. 23, 2008

(65) Prior Publication Data
US 2010/0059319 A1    Mar. 11, 2010

(51) Int. Cl.
| B66B 5/04 | (2006.01) |
| F16D 59/00 | (2006.01) |
| F16D 43/16 | (2006.01) |
| F16H 61/22 | (2006.01) |
| F16D 43/24 | (2006.01) |

(52) U.S. Cl.
CPC .................. *B66B 5/044* (2013.01); *F16D 43/16* (2013.01); *F16D 43/24* (2013.01)
USPC ........... 187/305; 187/373; 188/185; 188/189; 182/234; 74/336.5

(58) Field of Classification Search
CPC .......... B66B 5/044; B66B 5/20; B66B 5/046; F16D 59/00; F16D 43/14; F16D 43/18; F16D 51/32; F16D 51/42; F16D 2043/145; F16D 43/16; F16D 43/24; B60T 8/3205; B60T 8/324; B60T 8/54
USPC .................. 187/305, 373; 188/185, 180, 189; 74/336.5, 336 R, 439, 446, 591; 254/370, 375; 182/234; 192/14, 140, 192/105 C, 105 CP, 105 CD
IPC ....................................... B66B 5/04, 5/20, 5/24
See application file for complete search history.

(56) References Cited

U.S. PATENT DOCUMENTS 2,072,852 A * 3/1937 Batten et al. ..................... 192/75
2,588,482 A * 3/1952 Chapman ............... 192/105 CD (Continued)

FOREIGN PATENT DOCUMENTS

| DE | 934330 C | * 10/1955 | .............. F16D 43/16 |
| DE | 2 251 124 | 5/1973 | |

(Continued)

OTHER PUBLICATIONS

The Japanese Office Action Translation dated Mar. 27, 2012 for the Japanese Patent Application No. 2010-502423.

(Continued)

*Primary Examiner* — R William Rivera
*Assistant Examiner* — Stefan Kruer
(74) *Attorney, Agent, or Firm* — Cantor Colburn LLP (57) ABSTRACT

A mechanism for use in an elevator governor assembly including a ground configured to rotate about a ground axis, three or more circumferentially overlapping cams each pivotally attached to the ground at one of three or more ground pivot points radially spaced from the ground axis, and a plurality of links pivotally attaching the three or more cams to one another at a plurality of link pivot points. The circumferentially overlapping cams form a substantially contiguous circular ring about the ground axis. The interconnection of the ground, the cams, and the links form a generally circular mechanism.

19 Claims, 7 Drawing Sheets

(56) References Cited

U.S. PATENT DOCUMENTS

| | | | | |
|---|---|---|---|---|
| 2,673,633 A | * | 3/1954 | Miller et al. | 192/104 R |
| 2,957,565 A | * | 10/1960 | Brueder | 192/105 C |
| 3,024,886 A | * | 3/1962 | Peras | 192/105 CE |
| 3,208,571 A | * | 9/1965 | Bochory | 192/105 CD |
| 3,738,456 A | * | 6/1973 | Russell et al. | 188/184 |
| 4,246,523 A | * | 1/1981 | Nagai | 318/369 |
| 5,492,200 A | | 2/1996 | Korhonen | |
| 2004/0104096 A1 | * | 6/2004 | Genise | 192/105 CP |
| 2006/0003866 A1 | * | 1/2006 | Unno et al. | 477/44 |
| 2007/0275811 A1 | * | 11/2007 | Starik | 475/259 |
| 2011/0272217 A1 | * | 11/2011 | Niikawa | 187/305 |
| 2013/0098711 A1 | * | 4/2013 | Aguado et al. | 187/373 |
| 2013/0306409 A1 | * | 11/2013 | Dube | 187/287 |

FOREIGN PATENT DOCUMENTS

| | | | | |
|---|---|---|---|---|
| DE | 195 36 995 | | 4/1997 | |
| GB | 226932 A | * | 1/1925 | F16D 51/42 |
| GB | 719486 A | * | 12/1954 | F16D 51/42 |
| GB | 1042553 | | 7/1964 | |
| JP | 38-24341 | | 11/1938 | |
| JP | 48-53454 | | 7/1973 | |
| JP | 50-152456 A | * | 12/1975 | B66B 5/04 |
| NL | 6408173 | | 2/1965 | |
| WO | 0130680 | | 5/2001 | |

OTHER PUBLICATIONS

International Search Report—EP20071003299—Dated Jul. 11, 2007—10 pages.

* cited by examiner

GOVERNOR SHEAVE WITH AN OVERLAPPING FLYWEIGHT SYSTEM

BACKGROUND

The present invention relates to a device that controls elevator car speeds. More particularly, the invention relates to a centrifugally actuated governor.

A common challenge in elevator design is engineering safety systems to prevent or react to elevator malfunction. One such safety system is the speed governor. Elevator speed governors are designed to prevent elevator cars from exceeding a set speed limit. The governor is a component in an automated safety system, which is actuated when the elevator car exceeds a set speed and either signals a control system to stop the car or directly engages safeties to stop the car. One commonly known governor is a centrifugally actuated governor.

A common design of centrifugal governors used in elevator systems employs two masses, sometimes referred to as flyweights, connected kinematically in an opposing configuration by links and pinned to a tripping sheave rotating about a common axis. These interconnected parts create a governor mechanism, which rotates at an angular velocity common with the angular velocity of the sheave. The angular velocity of the rotating masses results in a centrifugal force acting to propel the masses away from the sheave axis of rotation. The movement of the masses is essentially a cantilevering motion radially outward about their pinned attachments to the sheave. A coupler prevents the radial outward movement of the masses up to a set elevator car speed. The coupler commonly includes a spring connected between the sheave and one of the masses, which resists the centrifugal force generated by the angular velocity of the rotating sheave up to a set speed. When the elevator car meets or exceeds a set speed limit, sometimes referred to as an overspeed condition, the governor is actuated. In the overspeed condition, the force of the governor coupler, for example the spring coupler, is overcome by the centrifugal force acting on the masses. The two masses move radially outward and commonly engage a sensor, which in turn signals safeties in the elevator system to slow or stop the elevator car.

There are several limitations to prior centrifugal governor designs. The governor mechanism including only two cantilevering masses leaves circumferential dead spaces in which the masses may not immediately engage the sensor after the governor is actuated, which in turn may delay the engagement of elevator safeties. The dead spaces inherent in prior centrifugal governor mechanisms create the risk of large elevator car speed increases during the period after the car reaches an overspeed condition and before safeties are engaged to slow or stop the car. The risk of large elevator car speed increments caused by the dead spaces in prior governor mechanisms creates several problems in elevator car systems. For example, large car speed increments may increase the risk of damage to system components, such as guide rails or active components of elevator safeties. Additionally, large car speed increments may cause back-up safety components to be actuated, which in some cases may make passenger rescue more time consuming and complicated.

In light of the foregoing, the present invention aims to resolve one or more of the aforementioned issues that afflict conventional governors.

SUMMARY

The present invention includes a mechanism for use in an elevator governor assembly including a ground configured to rotate about a ground axis, three or more circumferentially overlapping cams each pivotally attached to the ground at one of three or more ground pivot points radially spaced from the ground axis, and a plurality of links pivotally attaching the three or more cams to one another at a plurality of link pivot points. The circumferentially overlapping cams form a substantially contiguous circular ring about the ground axis. The interconnection of the ground, the cams, and the links form a generally circular mechanism.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are hereafter briefly described.

DETAILED DESCRIPTION

Efforts have been made throughout the drawings to use the same or similar reference numerals for the same or like components.

Figure 1:
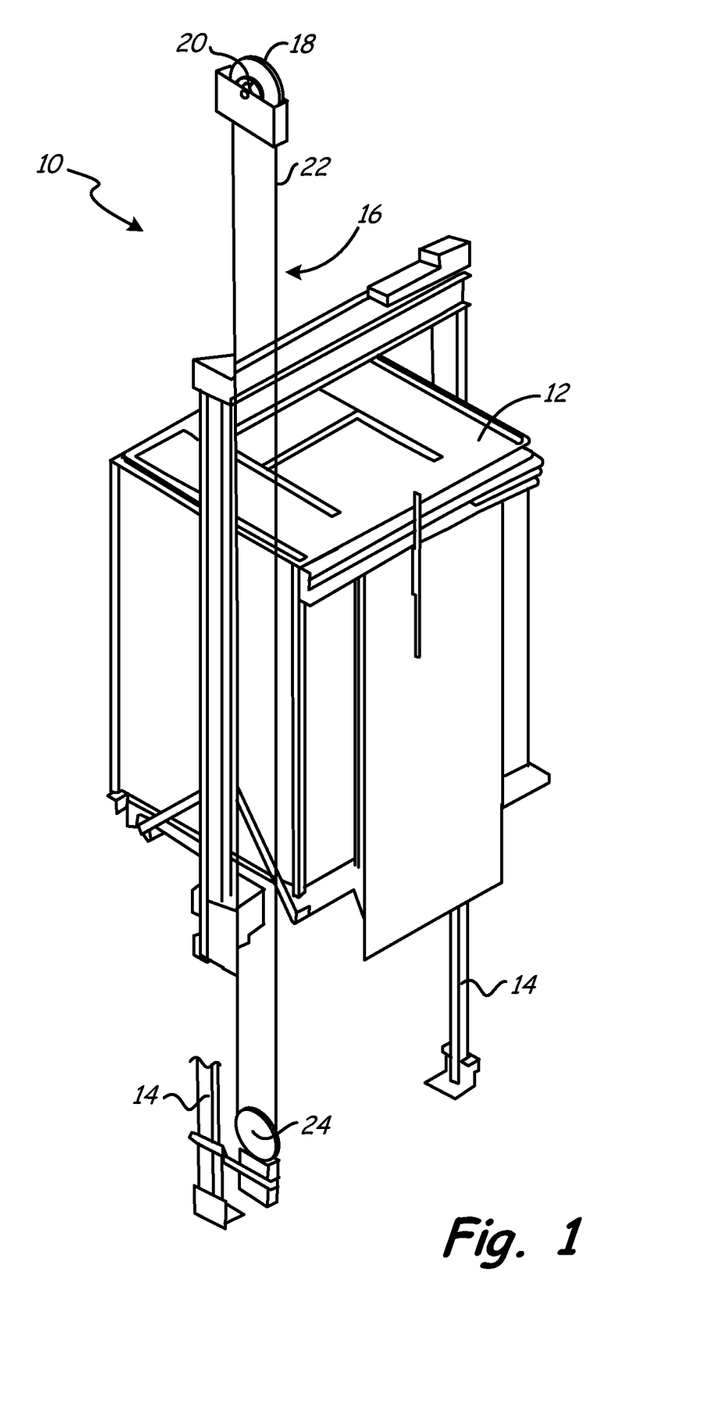
FIG. 1 is a perspective view of an elevator system including a governor.

FIG. 1 shows an elevator system 10, which includes an elevator car 12, guide rails 14, and a governor assembly 16. The governor assembly 16 includes a tripping sheave 18, a governor 20, a rope loop 22, and a tensioning sheave 24. The elevator car 12 travels on or is slidably connected to the guide rails 14 and travels inside a hoistway (not shown). The tripping sheave 18 and the governor 20 are mounted, in this embodiment, at an upper end of the hoistway. The rope loop 22 is wrapped partially around the tripping sheave 18 and partially around the tensioning sheave 24 (located in this embodiment at a bottom end of the hoistway). The rope loop 22 is also connected to the elevator car 12, ensuring that the angular velocity of the tripping sheave 18 is related to the speed of the elevator car 12.

In the elevator system 10 as shown in FIG. 1, the governor assembly 16 acts to prevent the elevator car 12 from exceeding a set speed as it travels inside the hoistway. Although the governor assembly 16 shown in FIG. 1 is mounted at an upper end of the hoistway, the location and arrangement of the governor assembly 16 may vary across different embodiments of the present invention. For example, the governor assembly 16 may be mounted at practically any point along the rope loop 22 in the hoistway, including at the bottom, i.e., pit, of the hoistway. In another embodiment, the governor assembly 16 may alternatively be mounted to and move with the elevator car 12. Such an alternative embodiment may, for example, involve a static rope anchored at the top and bottom of the hoistway and wrapped partially around the tripping sheave 18 and an adjacent idler sheave.

Figure 2:
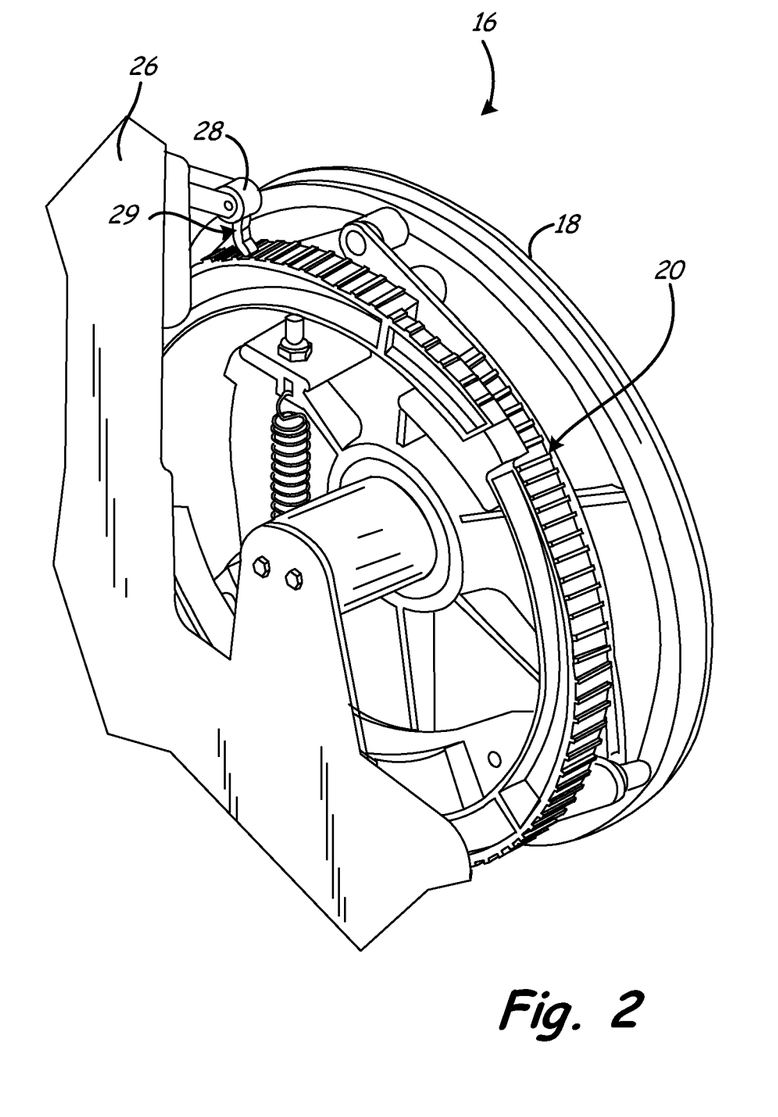
FIG. 2 is a partial view of a governor assembly including an embodiment of a governor according to the present invention.

FIG. 2 shows a partial view of the governor assembly 16, which includes the tripping sheave 18 (also referred to as a "ground"), the governor 20, a housing 26, and a sensor 28 that includes a switch 29. The governor 20 is attached to the tripping sheave 18, which is rotatably mounted to the housing 26. The governor 20 and the tripping sheave 18 rotate about a common axis 30 (shown in FIGS. 3A and 3B). Also attached to the housing 26 is the sensor 28. The sensor 28 may be a variety of devices that signal a change in state, including a mechanically activated electrical switch 29 such as that shown in FIG. 2. The governor 20 rotates with the tripping sheave 18 inside the housing 26, while the sensor 28 remains fixed to the housing 26. Under conditions described below, one function of the governor 20, when actuated, is to engage the sensor 28, which in turn communicates elevator control signals to a control system (not shown) that slows or stops the elevator car 12 by opening a series of relays in a safety circuit and by interrupting power to the drive, thereby initiating a dropping of the brake.

Figure 3A:
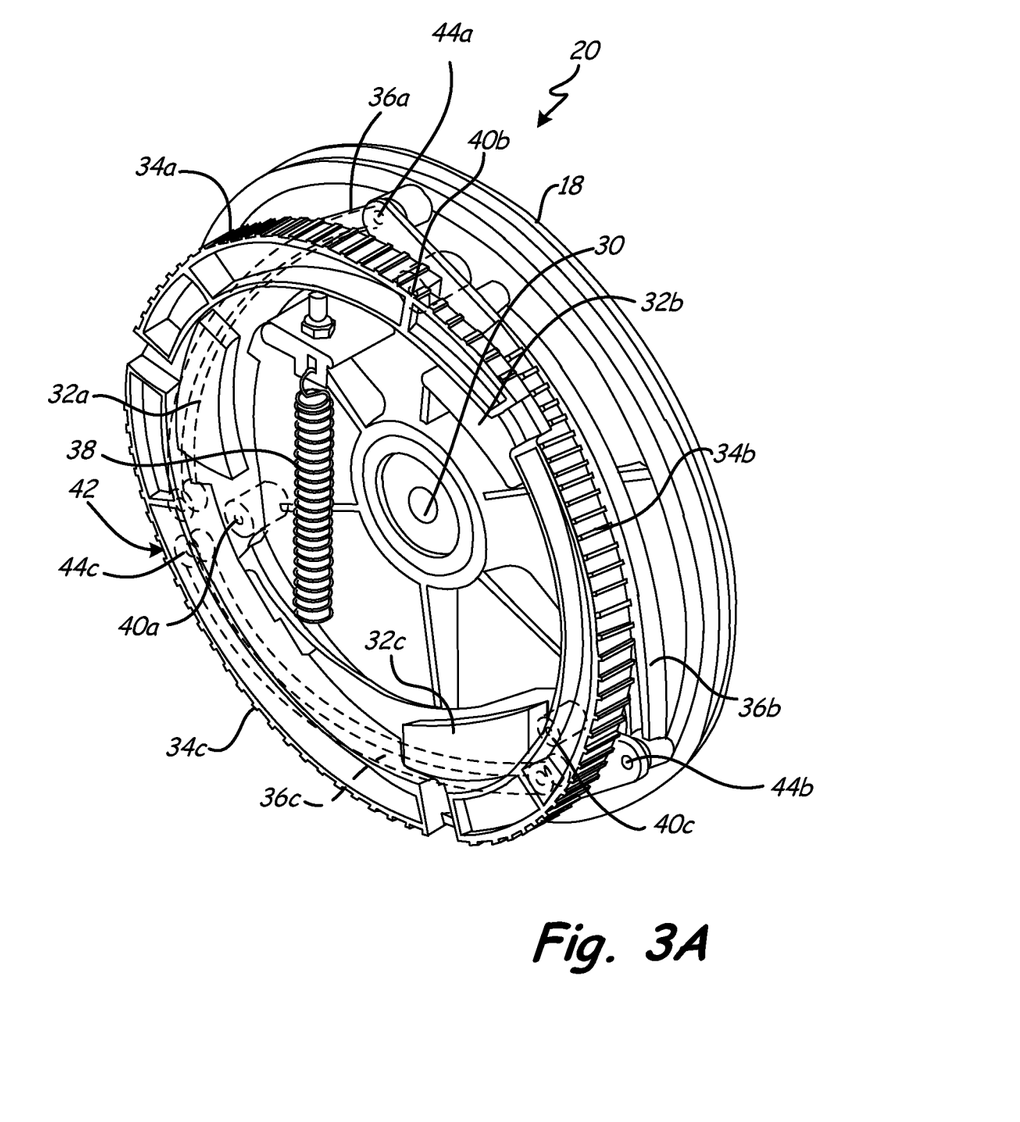
FIGS. 3A and 3B show perspective views of the governor shown in FIG. 2.
Figure 3B:
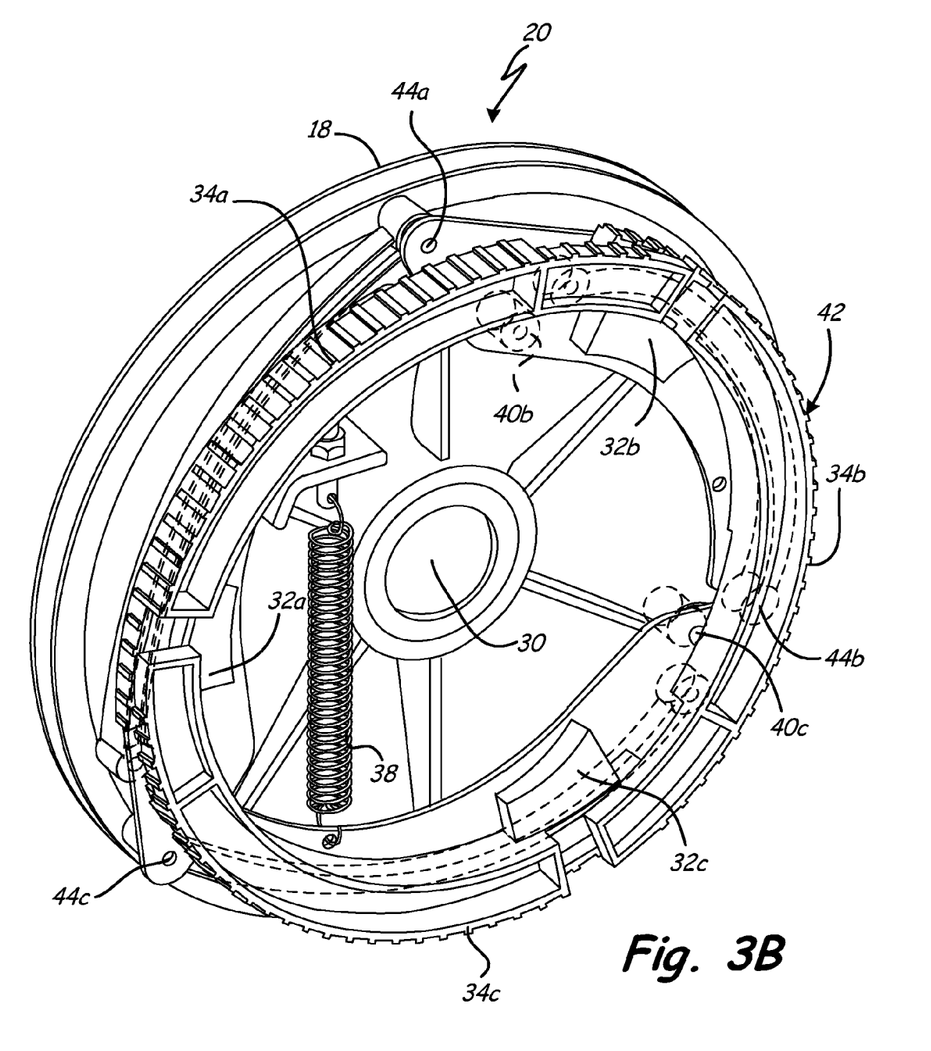

FIGS. 3A and 3B show perspective views of the governor 20 shown in FIG. 2. In FIGS. 3A and 3B, the governor 20 rotates about the sheave axis of rotation 30 and includes first, second, and third masses 32a, 32b, 32c (also referred to as "cams"), first, second, and third mass supports 34a, 34b, 34c, first, second, and third links 36a, 36b, 36c, and a coupler 38. The first mass 32a is attached to the first mass support 34a. The second mass 32b is attached to the second mass support 34b. The third mass 32c is attached to the third mass support 34c. The first mass support 34a is pivotally attached to the tripping sheave 18 at a first mass support pivot point 40a. The second mass support 34b is pivotally attached to the sheave 18 at a second mass support pivot point 40b. The third mass support 34c is pivotally attached to the sheave 18 at a third mass support pivot point 40c. The first mass support 34a is pivotally attached to the second mass support 34b by the first link 36a at a first link pivot point 44a. The second mass support 34b is pivotally attached to the third mass support 34c by the second link 36b at a second link pivot point 44b. The third mass support 34c is pivotally attached to the first mass support 34a by the third link 36c at a third link pivot point 44c. The first, second, and third masses 32a, 32b, 32c may be substantially identical to one another. The first, second, and third mass supports 34a, 34b, 34c may be generally arcuate and substantially identical to one another. And, the first, second, and third links 36a, 36b, 36c may also be substantially identical to one another.

In FIGS. 3A and 3B the masses 32a, 32b, 32c, and supports 34a, 34b, 34c are arranged in a circumferentially overlapping configuration to form a contiguous circular ring about the sheave axis of rotation 30. The masses 32a, 32b, 32c and mass supports 34a, 34b, 34c are pivotally attached to the sheave at the pivot points 40a, 40b, 40c and are pivotally attached to one another by the links 36a, 36b, 36c to form a generally circular mechanism 42 whose angular velocity is common with the angular velocity of the tripping sheave 18. The angular velocity of the mechanism 42 creates a centrifugal force acting to pivot the masses 32a, 32b, 32c and mass supports 34a, 34b, 34c away from the sheave axis of rotation 30 about the pivot points 40a, 40b, 40c on the tripping sheave 18.

The governor 20 also includes the coupler 38 between the mass support 34c and the tripping sheave 18. The coupler 38 provides a connection between the mass support 34c and the tripping sheave 18, which connection resists the centrifugal force created by the rotation of the sheave 18. As the sheave 18 rotates at angular velocities within a defined range, the mass support 34c, and thereby the two other interconnected mass supports 34a, 34b, does not substantially move radially outward about its pivot point 40c, and the governor 20 rotates with the sheave 18 without engaging the sensor 28.

Figure 4:
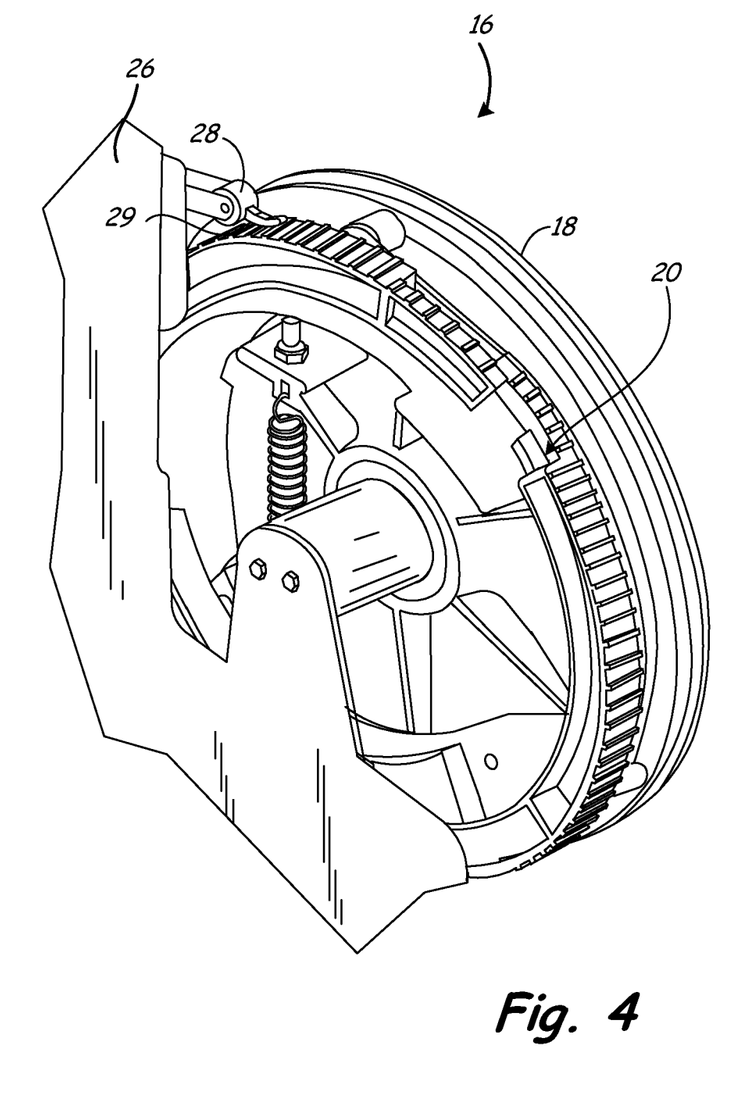
FIG. 4 is a perspective view of the governor of FIGS. 2, 3A, and 3B in an actuated state.

The governor 20 may be configured to be actuated when the connection provided by the coupler 38 is overcome at a set angular velocity of the sheave 18, as shown in FIG. 4. At such a set tripping angular velocity, the centrifugal force on the masses 32a, 32b, 32c exceeds the force created by the coupler 38, thereby causing the masses 32a, 32b, 32c and the mass supports 34a, 34b, 34c to move radially outward about their pivot points 40a, 40b, 40c such that the sensor 28 is engaged when one of the masses 32a, 32b, 32c contacts the switch 29.

Figure 5:
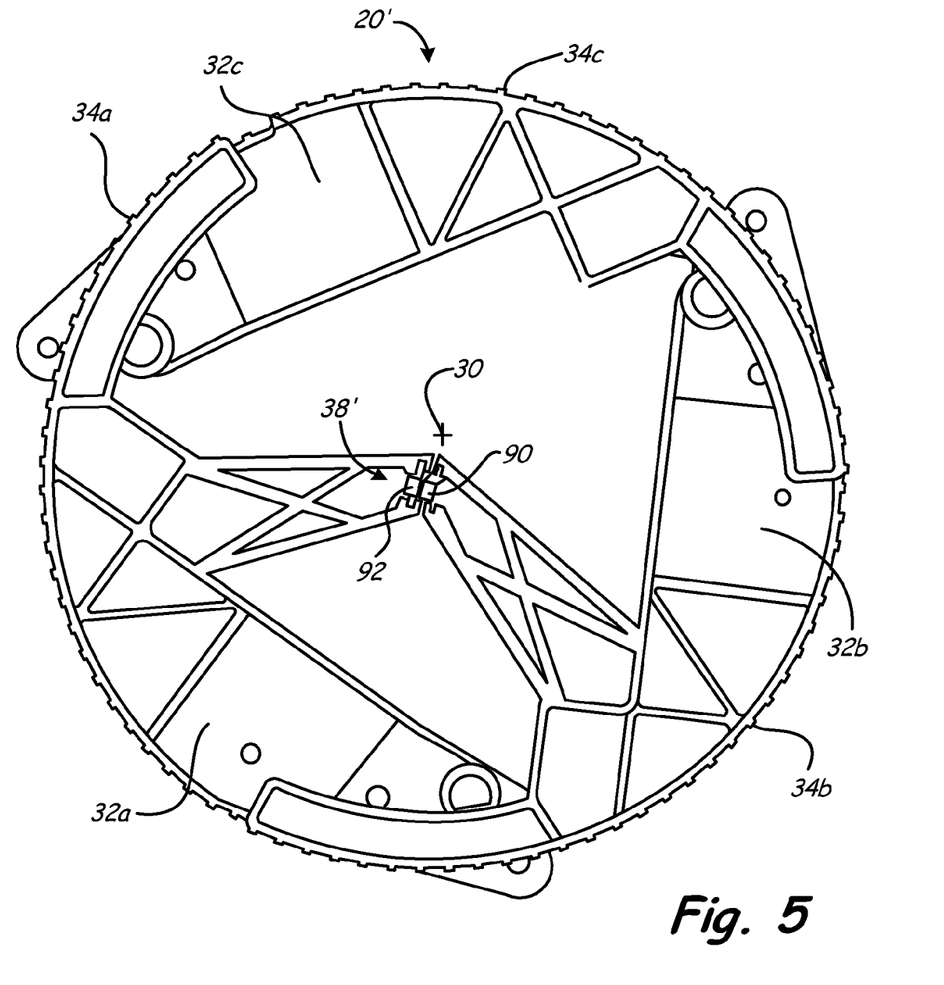
FIG. 5 is a front perspective view of a second embodiment of a governor according to the present invention.
Figure 6:
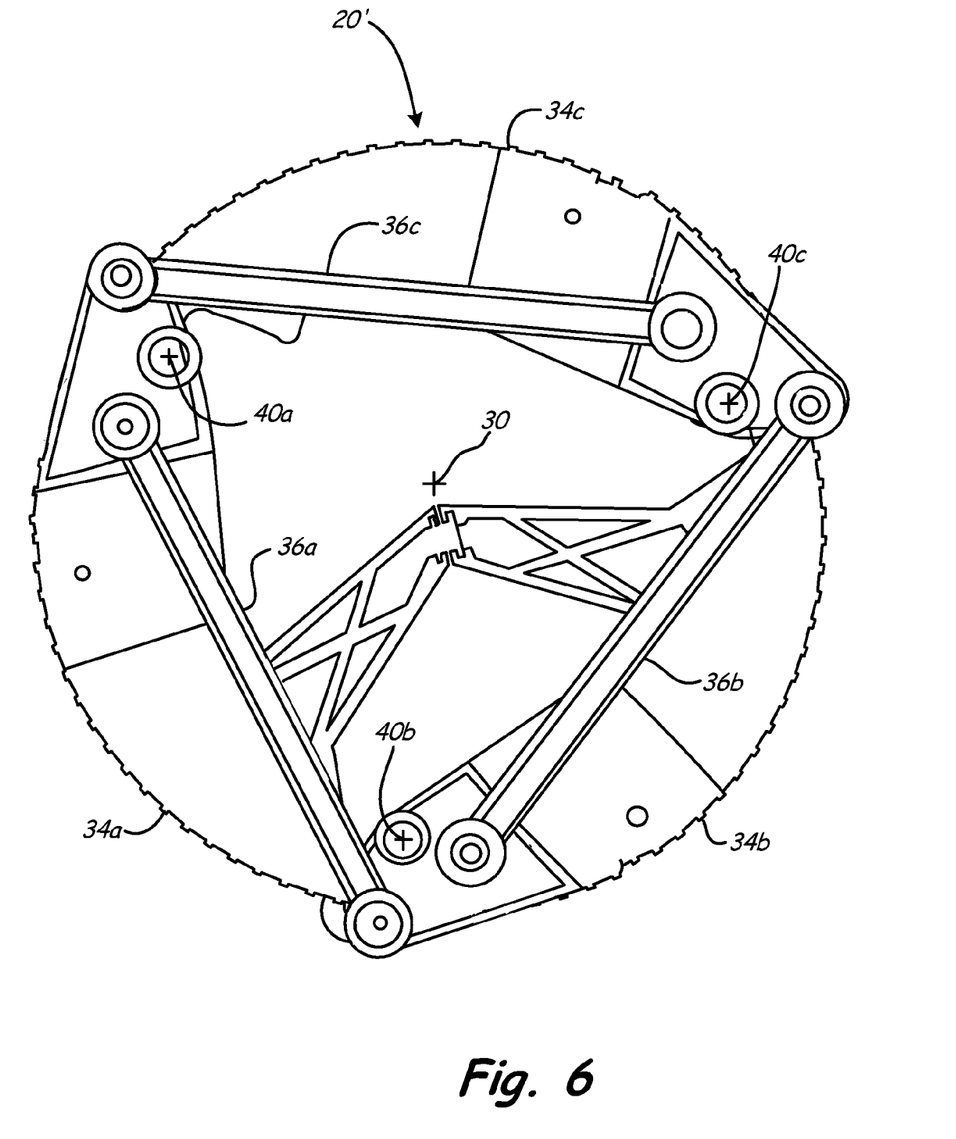
FIG. 6 is a rear perspective view of the governor shown in FIG. 5.

Governors according to the present invention may also include a releasable non-elastic coupler, such as a permanent magnet coupler, for controlling actuation of the governor. An example of such an alternate embodiment governor 20' is shown in FIGS. 5 and 6, which respectively show front and back perspective views of the alternative governor 20'. In this embodiment, the governor 20' rotates about the sheave axis of rotation 30 and includes a first mass 32a, a second mass 32b, a third mass 32c, a first mass support 34a, a second mass support 34b, and a third mass support 34c. The first mass 32a is attached to the first mass support 34a. The second mass 32b is attached to the second mass support 34b. The third mass 32c is attached to the third mass support 34c. The first mass support 34a is pivotally attached to the tripping sheave 18 (not shown) at a first mass support pivot point 40a. The second mass support 34b is pivotally attached to the sheave 18 at a second mass support pivot point 40b. The third mass support 34c is pivotally attached to the sheave 18 at a third mass support pivot point 40c. The first mass support 34a is pivotally attached to the second mass support 34b by a first link 36a. The second mass support 34b is pivotally attached to the third mass support 34c by a second link 36b. The third mass support 34c is pivotally attached to the first mass support 34a by a third link 36c.

The governor 20' also includes a releasable non-elastic coupler 38' between one of the mass supports 34a, 34b, 34c and the sheave 18, or between two of the mass supports, for example between mass supports 34a and 34b. In this embodiment, the releasable non-elastic coupler 38' is a permanent magnetic, which includes a first element 90 and a second element 92. The first element 90 may be a permanent magnet attached to the second mass support 34b. Similarly, the second element 92 may be a ferromagnetic material attached to the first mass support 34a. In such an embodiment, connector 38' may provide a magnetic connection between first and second mass supports 34a and 34b, which resists the centrifugal force created by the rotation of the sheave (not shown). As the sheave rotates at angular velocities within a defined range, the mass supports 34a, 34b remain magnetically connected, and the governor 20' rotates with the sheave 18 without engaging the sensor 28. The governor 20' is actuated when the magnetic connection provided by coupler 38' is overcome at a set angular velocity of the sheave 18, as the centrifugal force on masses 32a, 32b, and 32c exceeds the force created by the magnetic connection.

Connecting the masses 32a, 32b, 32c, supports 34a, 34b, 34c, and links 36a, 36b, 36c to form the generally circular governor mechanism 42 prescribes the motion of the mass supports 34a, 34b, 34c such that when in the non-actuated state, the mass supports 34a, 34b, 34c are radially spaced about the sheave axis of rotation 30 and, when actuated, the mass supports 34a, 34b, 34c move radially outward as a function of angular velocity to substantially create the circumference of a generally circular shape until the outer arcuate edges of the mass supports 34a, 34b, 34c engage the sensor 28. Because the mechanism 42 forms a substantially contiguous circle at the outer edges of mass supports 34a, 34b, 34c and provides the controlled motion previously described, once the governor 20, 20' is actuated it will almost immediately engage the sensor 28 regardless of the angular position of the mechanism 42 about the sheave axis of rotation 30. In other words, the governor 20, 20' greatly reduces the dead spaces associated with conventional governors.

The manufacturing costs of the governors 20 and 20' shown in FIGS. 2 and 5 may be reduced, as the total number of unique parts is reduced by repeating the masses 32a, 32b, 32c, supports 34a, 34b, 34c, and links 36a, 36b, 36c respectively circumferentially about the axis of rotation 30. These embodiments may also simplify maintenance of the governor 20, 20' by making the masses 32a, 32b, 32c, supports 34a, 34b, 34c, and links 36a, 36b, 36c respectively interchangeable.

The masses 32a, 32b, 32c, supports 34a, 34b, 34c, and links 36a, 36b, 36c can be constructed using manufacturing techniques well known to those ordinarily skilled in the art. For example, the masses 32a, 32b, 32c can be constructed from a variety of cast metal or stamped sheet metal materials. By way of another example, the mass supports 34a, 34b, 34c and the links 36a, 36b, 36c can be constructed from sheet metal, plastic, or a combination of metal and plastic and manufactured by stamping, casting, or injection molding.

Embodiments of the present invention eliminate many of the disadvantages of prior centrifugally actuated governors. Connecting the masses, mass supports, and links to form a governor mechanism according to the present invention prescribes the motion of the mass supports such that they form an adjustable generally circular ring that increases in diameter as a function of angular velocity until the outer arcuate edges of the mass supports engage a safety sensor. Because the mechanism forms a substantially contiguous circle at the outer edges of the mass supports and provides the controlled motion previously described, once the governor is actuated it will almost immediately engage the sensor regardless of the angular position of the mechanism about the sheave axis of rotation. In other words, governors according to the present invention are configured to remove dead spaces, which may otherwise delay signaling elevator safeties to slow or stop the elevator car. The removal of the dead spaces from centrifugal governors according to the present invention reduces the risk of large elevator car speed increases during the period after the car reaches an overspeed condition and before elevator safeties are engaged to slow or stop the car. Reducing the risk of large elevator car speed increments created by the dead spaces in prior governor mechanisms increases the overall safety of elevator car systems by, for example, reducing the risk of damage to system components.

The aforementioned discussion is intended to be merely illustrative of the present invention and should not be construed as limiting the appended claims to any particular embodiment or group of embodiments. For example, embodiments of governors according to the present invention may include more than three mass supports and masses arranged in a circumferentially overlapping configuration about the sheave axis of rotation. Thus, while the present invention has been described in particular detail with reference to specific exemplary embodiments thereof, it should also be appreciated that numerous modifications and changes may be made thereto without departing from the broader and intended scope of the invention as set forth in the claims that follow.

The specification and drawings are accordingly to be regarded in an illustrative manner and are not intended to limit the scope of the appended claims. In light of the foregoing disclosure of the present invention, one versed in the art would appreciate that there may be other embodiments and modifications within the scope of the present invention. Accordingly, all modifications attainable by one versed in the art from the present disclosure within the scope of the present invention are to be included as further embodiments of the present invention. The scope of the present invention is to be defined as set forth in the following claims.

The invention claimed is:

1. An elevator governor assembly comprising:
    a ground configured to rotate about a ground axis of rotation;
    three circumferentially overlapping cams each pivotally attached to the ground at one of three ground pivot points radially spaced from the ground axis of rotation, wherein a first end of each cam is positioned side-by-side and overlapping along an axis parallel to the ground axis of rotation with a second end of an adjacent cam so that radially outer edges of the cams form a substantially contiguous circular ring about the ground axis of rotation, wherein the axis parallel to the ground axis of rotation passes through the first end of a first cam and the second end of a second cam;
    a plurality of links pivotally attaching the three cams to one another at a plurality of link pivot points to form a generally circular mechanism;
    a sensor positioned radially outward of the substantially contiguous circular ring that can be engaged when one of the cams contacts the sensor to signal a change in state;
    a coupler separate from the plurality of links, the coupler configured to inhibit the generally circular mechanism from increasing in diameter about the ground axis of rotation at ground angular velocities less than a first velocity and to permit the generally circular mechanism to increase in diameter about the ground axis of rotation as a function of angular velocity at velocities greater than or equal to the first velocity; and wherein the plurality of link pivot points are positioned radially outwardly of the three overlapping cams relative to the ground axis of rotation.

2. The assembly of claim 1,
    wherein the three cams have substantially identical shapes.

3. The assembly of claim 2,
    wherein the three cams each further comprise a flyweight attached to the cam.

4. The assembly of claim 1,
    wherein the generally circular mechanism is configured to increase in diameter about the ground axis of rotation as a function of angular velocity.

5. An elevator governor assembly comprising:
    a sheave that is configured to rotate about a sheave axis of rotation at a velocity related to a velocity of an elevator car;
    three circumferentially overlapping masses each pivotally attached to the sheave at one of three mass pivot points radially spaced from the sheave axis of rotation, wherein a first end of each mass is positioned side-by-side and overlapping along an axis parallel to the sheave axis of rotation with a second end of an adjacent mass so that radially outer edges of the masses form a substantially contiguous circular ring about the sheave axis of rotation, wherein the axis parallel to the sheave axis of rotation passes through the first end of a first mass and the second end of a second mass; wherein each of the three masses comprises an arcuate mass support and a mass attached to the arcuate mass support;
a plurality of links pivotally attaching the three masses to one another at a plurality of link pivot points to form a generally circular mechanism, wherein the plurality of link pivot points are positioned radially outwardly of the three arcuate mass supports relative to the sheave axis of rotation; and
a sensor positioned radially outward of the substantially contiguous circular ring that can be engaged when one of the masses contacts the sensor to signal a change in state.

6. The assembly of claim 5 further comprising:
a coupler configured to inhibit the generally circular mechanism from increasing in diameter about the sheave axis of rotation at sheave angular velocities less than a first velocity and to permit the generally circular mechanism to increase in diameter about the sheave axis of rotation as a function of angular velocity at velocities greater than or equal to the first velocity.

7. The assembly of claim 6,
wherein the coupler comprises a spring connected between at least two of the circumferentially overlapping masses.

8. The assembly of claim 6,
wherein the coupler comprises one or more springs connected between one or more of the three masses and the sheave.

9. The assembly of claim 5,
wherein the three masses have substantially identical shapes.

10. The assembly of claim 5,
wherein the generally circular mechanism is configured to increase in diameter about the sheave axis of rotation as a function of angular velocity.

11. An elevator governor assembly comprising:
a sheave that is configured to rotate about a sheave axis of rotation at a velocity related to a velocity of an elevator car;
three masses each pivotally attached to the sheave at one of three mass pivot points radially spaced from the sheave axis of rotation, wherein a first end and a second end of each mass has a narrower width than a body of each mass, and wherein the first end of each mass is positioned side-by-side and overlapping along an axis parallel to the sheave axis of rotation with the second end of an adjacent mass, wherein the axis parallel to the sheave axis of rotation passes through the first end of a first mass and the second end of a second mass, wherein each of the three masses comprises an arcuate mass support and a mass attached to the arcuate mass support; and
a sensor positioned radially outward of the masses that can be engaged when one of the masses contacts the sensor to signal a change in state;
wherein the three masses are pivotally attached to one another by links at a plurality of link pivot points, wherein radially outer edges of the masses form a substantially contiguous circular mechanism configured to increase in diameter about the sheave axis of rotation as a function of angular velocity, wherein the plurality of link pivot points are positioned radially outwardly of the three arcuate mass supports relative to the sheave axis of rotation.

12. The assembly of claim 11 further comprising:
a coupler configured to inhibit the substantially contiguous circular mechanism from increasing in diameter about the sheave axis of rotation at sheave angular velocities less than a first velocity and to permit the generally circular mechanism to increase in diameter about the sheave axis of rotation as a function of angular velocity at velocities greater than or equal to the first velocity.

13. The assembly of claim 12,
wherein the coupler comprises a spring connected between at least two of the three masses.

14. The assembly of claim 12,
wherein the coupler comprises one or more springs connected between one or more of the three masses and the sheave.

15. The assembly of claim 11,
wherein the three masses have substantially identical shapes.

16. An elevator governor assembly comprising:
a sheave that is configured to rotate about a sheave axis of rotation at a velocity related to a velocity of an elevator car;
three circumferentially overlapping masses each pivotally attached to the sheave at one of three mass pivot points radially spaced from the sheave axis of rotation, wherein a first end of each mass is positioned side-by-side and overlapping along an axis parallel to the sheave axis of rotation with a second end of an adjacent mass so that radially outer edges of the masses form a substantially contiguous circular ring about the sheave axis of rotation, wherein the axis parallel to the sheave axis of rotation passes through the first end of a first mass and the second end of a second mass, wherein each of the three masses comprises an arcuate mass support and a mass attached to the arcuate mass support;
a plurality of links pivotally attaching the three masses to one another at a plurality of link pivot points to form a generally circular mechanism configured to increase in diameter about the sheave axis of rotation as a function of angular velocity, wherein the plurality of link pivot points are positioned radially outwardly of the three arcuate mass supports relative to the sheave axis of rotation;
a sensor positioned radially outward of the substantially contiguous circular ring that can be engaged when one of the masses contacts the sensor to signal a change in state; and
a coupler configured to inhibit the generally circular mechanism from increasing in diameter about the sheave axis of rotation at sheave angular velocities less than a first velocity and to permit the generally circular mechanism to increase in diameter about the sheave axis of rotation as a function of angular velocity at velocities greater than or equal to the first velocity.

17. The assembly of claim 16,
wherein the three masses have substantially identical shapes.

18. The assembly of claim 16,
wherein the coupler comprises a spring connected between at least two of the three circumferentially overlapping masses.

19. The assembly of claim 16,
wherein the coupler comprises one or more springs connected between one or more of the three circumferentially overlapping masses and the sheave.

* * * * *